US006985888B1

(12) United States Patent
Cordery et al.

(10) Patent No.: US 6,985,888 B1
(45) Date of Patent: Jan. 10, 2006

(54) SECURE USER CERTIFICATION FOR ELECTRONIC COMMERCE EMPLOYING VALUE METERING SYSTEM

(75) Inventors: Robert A. Cordery, Danbury, CT (US); David K. Lee, Monroe, CT (US); Leon A. Pintsov, W. Hartford, CT (US); Frederick W. Ryan, Jr., Oxford, CT (US); Monroe A. Weiant, Jr., Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 731 days.

(21) Appl. No.: 09/650,174

(22) Filed: Aug. 29, 2000

Related U.S. Application Data

(60) Division of application No. 09/133,706, filed on Aug. 13, 1998, now Pat. No. 6,134,328, which is a continuation of application No. 08/518,404, filed on Aug. 21, 1995, now Pat. No. 5,796,841.

(51) Int. Cl.
*G06F 17/60* (2006.01)
(52) U.S. Cl. ............... 705/60; 705/62; 713/150; 713/170
(58) Field of Classification Search ............ 705/61, 705/62, 63, 76, 77, 60, 401; 380/255; 713/150, 713/155, 156, 168, 170, 176, 181
See application file for complete search history.

(56) References Cited

U.S. PATENT DOCUMENTS

| 4,405,829 A | 9/1983 | Rivest ................... 178/22 |
| 4,625,076 A | 11/1986 | Okamoto et al. ......... 178/22 |
| 4,725,718 A | 2/1988 | Sansone et al. ......... 235/495 |
| 4,757,537 A | 7/1988 | Edelmann et al. ........ 380/51 |
| 4,775,246 A | 10/1988 | Edelmann et al. ........ 380/23 |
| 4,802,218 A | 1/1989 | Wright et al. |
| 4,831,555 A | 5/1989 | Sansone et al. ......... 364/519 |

(Continued)

FOREIGN PATENT DOCUMENTS

| EP | 0416916 | 9/1990 |

(Continued)

OTHER PUBLICATIONS

Anonymous, "Cryptography is the Key to Intranet Security Needs", Computer Reseller News, No. 743, pp. 107-110, Jun. 1997.*

(Continued)

*Primary Examiner*—John W. Hayes
(74) *Attorney, Agent, or Firm*—Brian A. Lemm; Charles R. Malandra, Jr.; Angelo N. Chaclas

(57) ABSTRACT

A system and method include means for processing a cryptographic certificate adapted to provide security functionality. A register means is provided and means for adjusting the register means to account for services when the cryptographic certificate is processed. In accordance with anther aspect, a system and method include a register means for storing funds. Means are provided for processing a digital token providing proof of postage payment and means are also provided for processing a cryptographic certificate adapted to provide security functionality. Means debit funds stored in the register means when the digital token is processed and when the cryptographic certificate is processed. Processing the cryptographic certificate may involve many functions such as providing security services and/or certificate management functions (including generating and verifying cryptographic certificates) and/or key management functions and/or access to any needed private keys to perform security services. Processing the digital token may include generating the digital token or issuing the digital token.

2 Claims, 8 Drawing Sheets

U.S. PATENT DOCUMENTS

| | | | |
|---|---|---|---|
| 4,868,877 A * | 9/1989 | Fischer | 380/25 |
| 4,873,645 A | 10/1989 | Hunter et al. | 364/479 |
| 5,001,752 A | 3/1991 | Fischer | 380/23 |
| 5,005,200 A | 4/1991 | Fischer | |
| 5,136,647 A | 8/1992 | Haber et al. | 380/49 |
| 5,181,245 A | 1/1993 | Jones et al. | 380/23 |
| 5,214,702 A | 5/1993 | Fischer | |
| 5,373,561 A | 12/1994 | Haber et al. | 380/49 |
| 5,448,641 A | 9/1995 | Pintsov et al. | 380/51 |
| 5,586,036 A | 12/1996 | Pintsov | |
| 5,606,507 A | 2/1997 | Kara | |
| 5,680,463 A | 10/1997 | Windel et al. | |
| 5,715,314 A | 2/1998 | Payne et al. | |
| 5,771,289 A * | 6/1998 | Kuzma | 380/23 |
| 5,796,841 A * | 8/1998 | Cordery et al. | 380/55 |
| 5,884,292 A | 3/1999 | Baker et al. | 705/403 |
| 5,903,882 A * | 5/1999 | Asay et al. | 705/44 |
| 5,923,759 A | 7/1999 | Lee | |
| 5,949,879 A * | 9/1999 | Berson et al. | 380/23 |
| 6,003,014 A * | 12/1999 | Lee et al. | 705/41 |
| 6,044,350 A * | 3/2000 | Weiant, Jr. et al. | 713/166 |
| 6,105,010 A * | 8/2000 | Musgrave | 705/44 |
| 6,134,328 A * | 10/2000 | Cordery et al. | 380/55 |
| 6,415,156 B1 * | 7/2002 | Stadelmann | 455/466 |

FOREIGN PATENT DOCUMENTS

| | | | |
|---|---|---|---|
| WO | WO 92/09161 | * | 5/1992 |
| WO | WO 95/19016 | | 7/1995 |

OTHER PUBLICATIONS

Verisign, "VeriSign Federal Markets Division Enables Digital Certificate Security for Government Agencies", Press Release, Dialog File 813:PR Newswire, Apr. 27, 1998.*

Anonymous, "SET-Enabled CA", InternetWeek, p. 23. Sep. 8, 1997.*

* cited by examiner

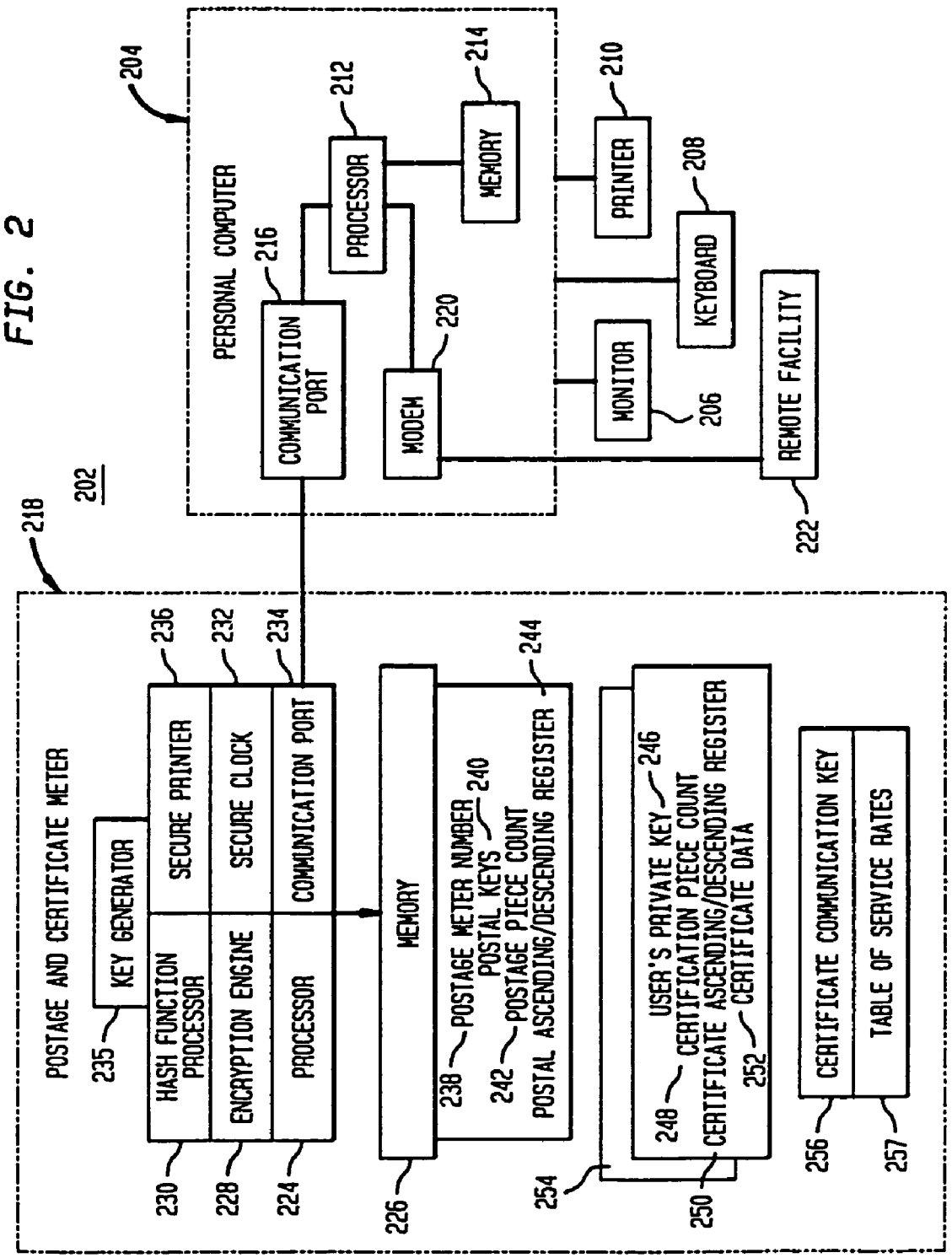

SECURE USER CERTIFICATION FOR ELECTRONIC COMMERCE EMPLOYING VALUE METERING SYSTEM

This application is a divisional application of Ser. No. 09/133,706, filed Aug. 13, 1998, now U.S. Pat. No. 6,134,328, which is a continuation application of Ser. No. 08/518,404, filed Aug. 21, 1995, now U.S. Pat. No. 5,796,841.

FIELD OF THE INVENTION

Present invention pertains to certification of users for electronic commerce, and more particularly, to a secure user certification system for electronic commerce that provides an accounting system for services provided.

BACKGROUND OF THE INVENTION

In electronic commerce various parties conduct activities without face to face contact. Accordingly, it becomes desirable for each party to any given transaction to be able to determine and verify the authenticity of the other party to the transaction.

Each user can authenticate messages from the other party by the use of a certificate digitally signed by a trusted third party. The critical part of the user's certificate is the user's public key. The authenticity of the certificate can be established by verifying the digital signature of the trusted third party. A message from the user can be authenticated by verifying that it has been digitally signed using the private key matching the public key in the certificate.

A transaction may also require security services. These may include, for example, message integrity, message authentication, message confidentiality, and message non-repudiation. The meaning of the message integrity is, that the message has not been altered. Message authentication is that the message is genuine and was signed by the other party. Message confidentiality is that the message contents are available only to the authorized parties to the transaction and no other parties. And finally, message non-repudiation is that the initiator of the message is unable to repudiate at a later time that the message originated with such party.

In a traditional paper based transaction, the above security services are normally implemented by means of signature, seals, stamps and the like. In an electronic commerce environment these security services are achieved by cryptographic techniques such as digital signature, hash codes, encryption algorithms, and the like.

In order to effectively implement the above security services, a party to an electronic commerce transaction, must have access to a secure cryptographic device capable of securely implementing these cryptographic techniques.

It should be recognized that various protocols have been designed to implement the above mentioned security services. An example of this is set forth in Section 2.1 of the US Department of Commerce document entitled Standard for Public Key Cryptographic Entity Authentication Mechanism, Draft, Mar. 13, 1995, Federal Information Processing Standards Publication JJJ. Public key cryptography algorithms including RSA and algorithms based on Elliptic Curves are used to encrypt, authenticate, and verify integrity of messages. Message digests are generated with algorithms including MD5 and the Secure Hash Algorithm (SHA).

It is known that to enable the above types of cryptographic services, a set of keys is needed. This can be a set of secret keys (for a secret key system) and/or public and private keys (for a public key system). The secret and private keys have to be securely communicated or otherwise provided to a user and thereafter protected.

Public key cryptographic certificates, Certificate Authority and Certificate Management are also known and are the subject of standards. For example ANSI standards X.509 deals with Certificate Management and X.9.30-3 describes Certificate Management for Digital Signature Algorithm. Secure cryptographic Certificate Management devices are known that utilize public key cryptography to verify certificates of public keys, and use the private portion of the key to authenticate documents, transactions, and communications and perform other cryptographic functions. Various enterprises have proposed being a Certificate Authority, for example, the United States Postal Service has proposed entering into electronic commerce as a Certificate Authority based on its acceptance as a trusted third party.

SUMMARY OF THE INVENTION

The present invention provides practical means of implementing certification processes achieving this goal for a large group of users on an economical basis.

An object of the present invention is to provide a convenient payment system for use in electronic commerce.

Another object of the present invention is to provide a convenient key management system for use in electronic commerce.

Postage meters are known that use secure cryptographic means to receive funds and to provide convenient secure evidence of postage payment; however, it has been discovered that various postage evidencing devices and systems have within them the capability of being modified to provide a broader security device functionality.

It has further been discovered that the postage evidencing devices enable a payment method for the services of the trusted third party.

A further object of the present invention is to utilize a postage or other value evidencing device to provide security services.

Still a further object of the present invention is to enable security services such as authentication, data integrity and confidentiality by utilizing the user's private and/or secret keys stored and protected in the value evidencing device.

Yet a further object of the present invention is to implement certificate management functions such as issue of certificates, certificate revocation and certificate verification within a value evidencing device.

An additional object of the present invention is to enable a payment system for the certificate management services provided by the trusted third party.

Yet an additional object of the present invention is to provide for inspection aimed at detection of key compromise carried out by tampering with a value evidencing device.

A system and method embodying the present invention include means for processing a cryptographic certificate adapted to provide security functionality. A register means is provided and means, connected to the register means and the processing means, for adjusting the register means to account for services when the cryptographic certificate is processed and/or when other security services are performed.

In accordance with another aspect of the present invention a system and method include a register means for storing funds. Means are provided for processing a digital token adapted to be imprinted on a mail piece as a proof of postage payment and means are also provided for processing a cryptographic certificate adapted to provide security functionality. Means are provided which are operatively connected to the register means and to both the digital token processing means and the certificate processing means, to debit funds stored in the register means when the digital token is processed and when the cryptographic certificate is processed.

BRIEF DESCRIPTION OF THE DRAWINGS

Reference is now made to the following Figures wherein like reference numerals designate similar elements in the various views and in which:

FIG. 2 is a value metering system, here a postage metering and certificate metering system embodying the present invention; processing a cryptographic certificate includes the above mentioned certificate management functions and use of the private key to perform security services;

DETAILED DESCRIPTION OF THE PREFERRED EMBODIMENT

Figure 1:
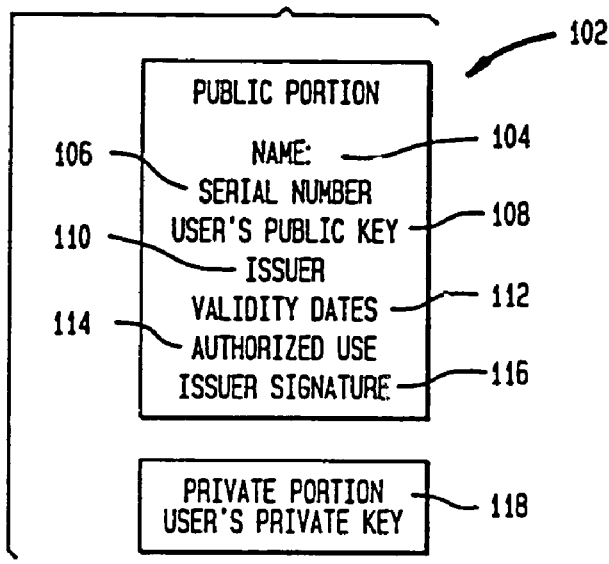
FIG. 1 is a public key certificate and private key helpful to an understanding of the present invention.

A postage and certificate meter provides certificate management services including use of cryptographically secured certificates issued by a certificate authority. As more transactions are occurring electronically, rather than by physical mail, between parties who do not meet each other personally, a trusted third party is needed. Postal services have an infrastructure, governmental authority, and responsibility for universal access that makes them a natural choice for a certificate authority although other third parties may also provide services and be a certificate authority. The present system provides significant advantage, because the postage and certificate meter is a secure, inspected cryptographic device that the postal service has licensed an authenticated entity to use. The device extends the use of the postage meter to electronic commerce applications without duplicating expensive infrastructure. Small charges for processing certificates including issuing certificates and for processing such as generating and verifying electronic certificates also referred to as electronic postmarks can be paid using funds stored in the meter.

A postage and certificate meter combines the functionality of a postage meter and a certificate management device, providing significant advantage to the postal service (and other certification authorities) and to the user. The postage and certificate meter is a secure cryptographic device with secret information that allows secure communication with the certificate authority such as a post office or other trusted third party and capability to use, manage and execute various security services. The postage and certificate meter includes metering and accounting capability that allows convenient low cost payment of charges per use of a certificate.

Advantages to the postal service as a trusted third party or to any other trusted third party include: manage keys for fewer secure devices; increased use of existing meter tracking infrastructure; fewer devices to inspect; legal right to inspect already in place; provides secure communication channel between postage and certificate meter and certificate authority; produce authenticated messages for postal service regarding the status and usage of the meter, thus providing additional security and assurance for postal funds and certificate authority payments; use of the postage and certificate meter for postage payment provides ongoing assurance to the certificate authority that the device is operating correctly, and has not been abused.

Advantages to the user include: a single secure co-processor to validate payment of certificate use charges and postage reduces the number of secure devices to manage; a single account to pay for certificate usage and postage; postage and certificate meter can efficiently pay certificate authority charges for processing certificates including new certificates and for use of the certificate; secure installation, storage and use of the private portion of the certificate; and, secure revocation of certificates.

Reference is now made to FIG. 1. A certificate 102 is a file of data containing certain information which provides a secure user certification useful in electronic commerce. The certificate 102, which may be an electronic file or a tangible file such as a printed document or smart card or the like, enables a certificate holder to engage in various commercial and other activities which require services of authentication, privacy, data integrity and non-repudiation. The certificate 102 includes an identification of the certificate holder and the certificate holder's public key, signed with the private key of the certification authority, usually a trusted third party.

The certificate data may include, for example, the unique name of the user, a serial number or certificate number, that is, a unique number associated with the certificate, the public key of the user, the identity of the certificate authority or issuer, the validity dates for the certificate and the authorized use of the certificate. The private portion of the user's key shown at 118 is maintained and protected by the postage and certificate meter for the user. It is understood that the user's private key is the private key matching the certificate's public key. When user wants to send a message, the message is signed with the user's private key. The recipient of the signed message verifies the authenticity of the sender's certificate using the certificate authority's public key, and subsequently verifies the authenticity of the message using the sender's public key which may be obtained from the certificate.

Reference is now made to FIG. 2. A value and certificate metering system shown generally at 202 includes a personal computer 204 having a monitor 206, a keyboard 208, and is connected to a printer 210. The personal computer 204 additionally includes a processing subsystem 212 having an associated memory 214. The processor is connected to a communications port 216 for communication with a secure postage and certificate meter subsystem 218 and a modem 220 for communicating with a remote facility 222. It should be recognized that many variations in the organization and structure of the personal computer 204 as well as the postage metering and certificate metering subsystem 218 can be implemented. As an example, the communications from the modem to the remote facility can be by way of hardwire or can be by way of radio frequency communications or other communications. The postage and certificate metering subsystem take many forms, for example it may be a secure vault type system, or a secure smart card system.

The postage portion of the postage and certificate meter 218, for example, may be similar to any of numerous postage metering systems as for example the systems shown in postage metering systems which generate and employ digital tokens are described in U.S. Pat. No. 4,757,537 for SYSTEM FOR DETECTING UNACCOUNTED FOR PRINTING IN A VALUE PRINTING SYSTEM, issued Jul. 12, 1988; U.S. Pat. No. 4,831,555 for SECURE POSTAGE APPLYING SYSTEM, issued May 15, 1989; U.S. Pat. No. 4,775,246 for SYSTEM FOR DETECTING UNACCOUNTED FOR PRINTING IN A VALUE PRINTING SYSTEM, issued Oct. 4, 1988; U.S. Pat. No. 4,873,645 for SECURE POSTAGE DISPENSING SYSTEM issued Oct. 10, 1989 and, U.S. Pat. No. 4,725,718 for POSTAGE AND MAILING INFORMATION APPLYING SYSTEMS, issued Feb. 16, 1988. These systems, which may utilize a device termed a postage evidencing device (PED), employ an encryption algorithm which is utilized to encrypt selected information to generate the digital token. The encryption of the information provides security to prevent altering of the printed information in a manner such that any change in a postal revenue block is detectable by appropriate verification procedures. Moreover the system for the cryptographic capability may employ systems and methods such as those disclosed in pending U.S. patent application Ser. No. 08/414,563 filed Mar. 31, 1995, for CRYPTOGRAPHIC KEY MANAGEMENT AND VALIDATING SYSTEM, which is assigned to Pitney Bowes, Inc., the entire disclosure of which is hereby incorporated by reference.

The postage and certificate meter subsystem 218 includes a processor 224 coupled to a memory 226. The processor has associated with it an encryption engine 228, a hash function processor 230, a secure clock 232 and a communications port 234. A key generator 235 is also provided for generating keys for use by the postage and certificate mailer. If desired, either a secure printer or a non-secure printer may be connected to the postage and certificate meter subsystem 218, if a printing capability is desired. In the FIG. 2, a secure printer is shown at 236. The memory 226 may have stored within it different data as well as the operating program for the postage and certificate meter subsystem 218. The data shown as stored in the memory include the postage meter serial number 238, postal keys 240, postage piece count 242, postage ascending/descending register 244. If the meter was a current account meter unit such as employed in certain European countries, the ascending/descending register would be only an ascending register. Current account systems may be employed in the present system.

Additionally stored within the postage and certificate meter 218 memory 226 are user's private key 246, certificate piece count 248, and certificate ascending/descending register 250. This register may be combined with the postage ascending/descending register. Other certificate data shown generally at 252 may also be stored in the memory as well as a certificate communications key 256. A Table of Services Rates is provided at 257. This table includes the rates for the various services that may be obtained when processing a cryptographic certificate and/or when processing a digital token. The rating system for the postage and certificate meter 218 may implement the system disclosed in U.S. patent application Ser. No. 08/133,398 filed Oct. 8, 1993 for POSTAGE RATING SYSTEM WITH VERIFIABLE INTEGRITY, the entire disclosure of which is hereby incorporated by reference. As is shown by memory area 254, more than one certificate may be stored in the memory 226.

It should specifically be noted that processing a cryptographic certificate may involve security services and/or certificate management functions including generating and verifying cryptographic certificates and/or key management functions and/or access to any needed private keys to perform security services.

Figure 3:
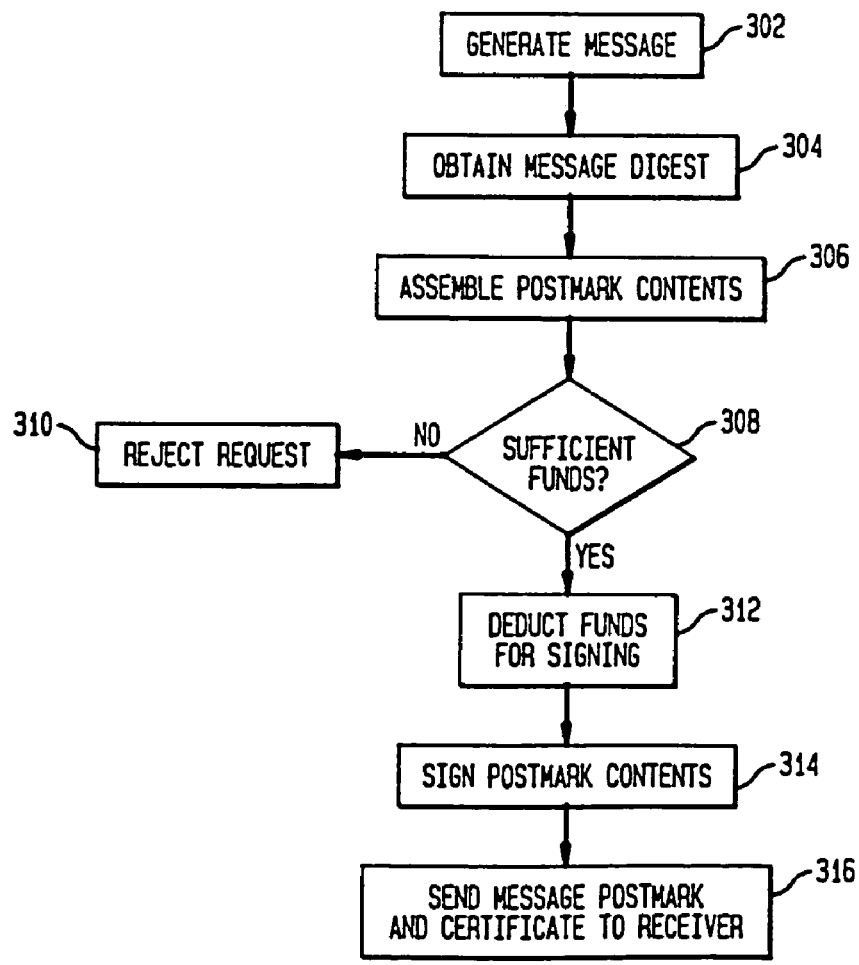
FIG. 3 is a flow chart of the generation of a cryptographic postmark which may be associated with a message to be communicated by the system shown in FIG. 2.

Reference is now made to FIG. 3 depicting the generation of a cryptographic postmark. A cryptographic postmark is a datafile which may contain message digest, date, time and other data which may be required to provide security services. A message is generated at 302. The message may be generated in the computer 204 or elsewhere depending upon the particular needs of the user. A message digest is obtained at 304 employing the hash function processor 230 of the postage and certificate meter subsystem 218. The postmark content is assembled at 306. Postmark content as was previously noted may include the message digest, a date time stamp from the secure clock 232, a serial number, and any other desirable data as an option. A determination is made at 308 if sufficient funds exist in the postage and certificate meter subsystem 218 to proceed with the generation of the cryptographic postmark. It should be recognized that these funds may be stored in the descending certificate register, the descending postal register or other registers within the subsystem containing an indication of available funds of the user or party paying for the postmark. If sufficient funds are not available, the request for postmark generation is rejected at 310. If, on the other hand, sufficient funds are available, the funds are deducted for the signing of the assembled postmark content at 312. The postmark content is then signed at 314 to produce a postmark and the message, postmark and certificate are sent to the desired location at 316. This may be a remote facility where it is first communicated through the communications port 234 to the personal computer communication port 216 and thereafter via the processor 212 and modem 220 to the remote facility. Alternatively, the secure (or non-secure) printer of the postage and certificate meter sub unit 218 may print a hard copy of the message, postmark and certificate. This also may be printed on printer 210 of the personal computer. Additionally, the message, postmark and certificate may also be stored in memory 214 of the personal computer 204 and/or memory 226 of the postage and certificate meter 218.

Figure 3A:
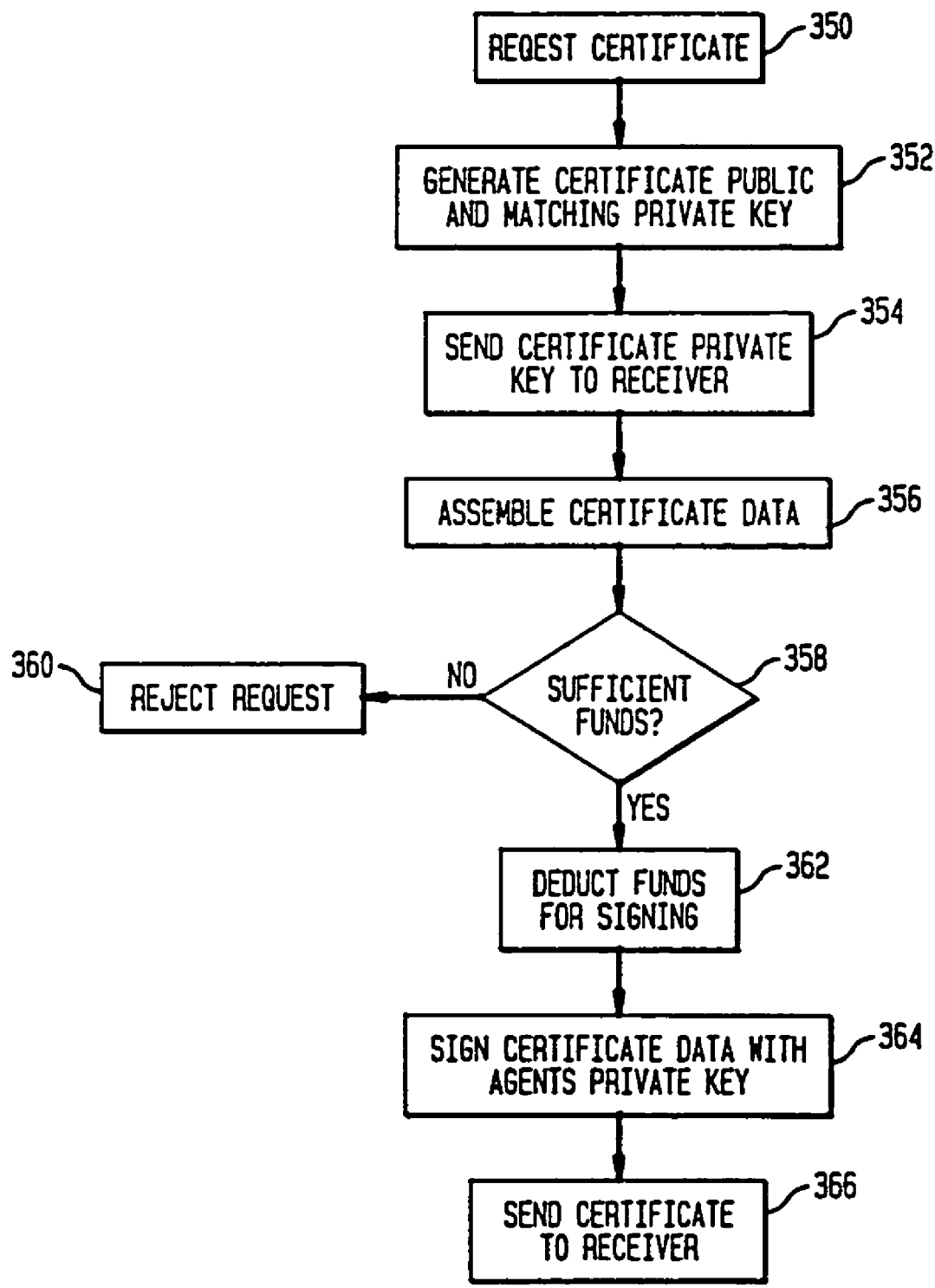
FIG. 3A is a flow chart of the generation of a cryptographic postmark by an agent employing the system as shown in FIG. 2.

Reference is now made to FIG. 3A, a user of the postage certificate meter 218 can act as a certificate agent. For example, a business may wish to issue certificates for their employees. The postage and certificate meter 218 can provide a tool to securely generate the public and private keys. The postage and certificate meter 218 private key can be employed to sign the certificate. Another party who receives the certificate has assurance that the certificate was generated under the authority of the postage certificate meter 218 issued to that business.

The agent sends a request for a certificate to the agent's certificate meter at 350. The request may include any data typically included in a certificate including expiration date, issuing authority, purposes the certificate is authorized for, the unique name of the party the certificate is issue for, and any other data describing allowed or limited uses of the certificate. The certificate meter generates a public and private key pair at 351. The process of generating the key pair is secured in the certificate meter in the key generator of the postage and certificate meter 218. At 354 the private key is sent to the receiver. The private key must be securely communicated to the receiver, for example it may be encrypted, or security measures may be taken to provide assurance that the key is not intercepted. The postage and certificate meter 218 assembles the certificate data at 356.

At 358 the certificate meter 218 determines the charge for signing the certificate, and if a determination is made that there is not sufficient funds to pay for signing the certificate data with the agent's certificate meter private key, then the request is rejected at 360. If a determination is made at 358 that there is sufficient funds then funds for signing are deducted at 362 and the certificate is signed at 364 and the certificate sent to the receiver at 366.

Figure 4:
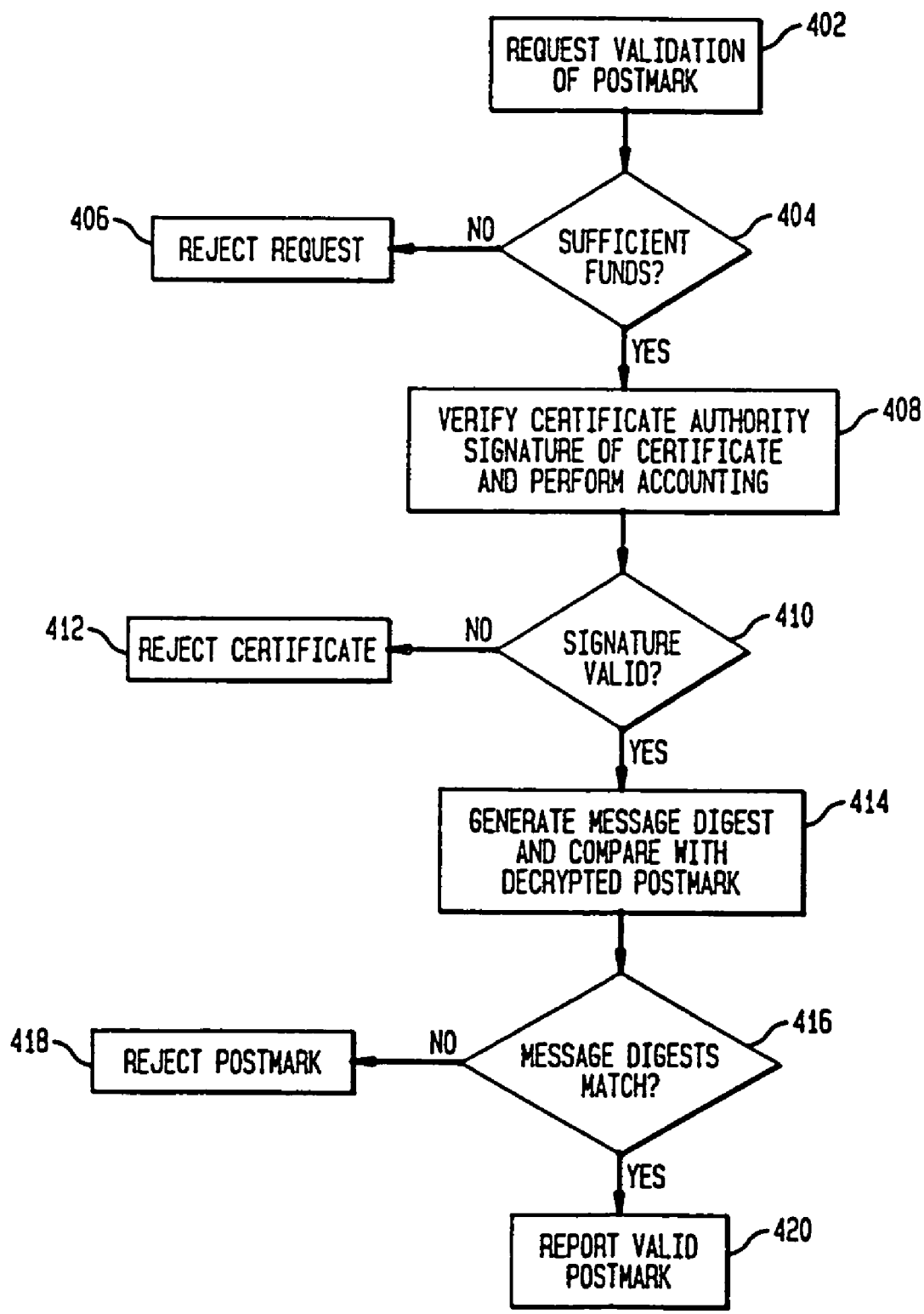
FIG. 4 is a flow chart of the validation of a cryptographic postmark as carried out by the system shown in FIG. 2.

Reference is now made to FIG. 4 showing the validation of a cryptographic postmark. A request for validation of the postmark is initiated at 402. A determination is made at 404 if sufficient funds are available within the postage and certificate meter subsystem 218. If sufficient funds are not available the request is rejected at 406. If sufficient funds are available the requester utilizes the certificate authority's public key to verify the signature of the certificate at 408 and accounts for it. If the signature is determined not to be valid at 410, the certificate is rejected at 412. If the signature is determined to be valid at 410, a message digest is generated and compared with the decrypted postmark at 414. A determination is made at 416 if the generated message digest and the message digest in the decrypted postmark match. If they do not match the postmark is rejected at 418. If, on the other hand, they do match, the postmark is reported as valid at 420.

Figure 5:
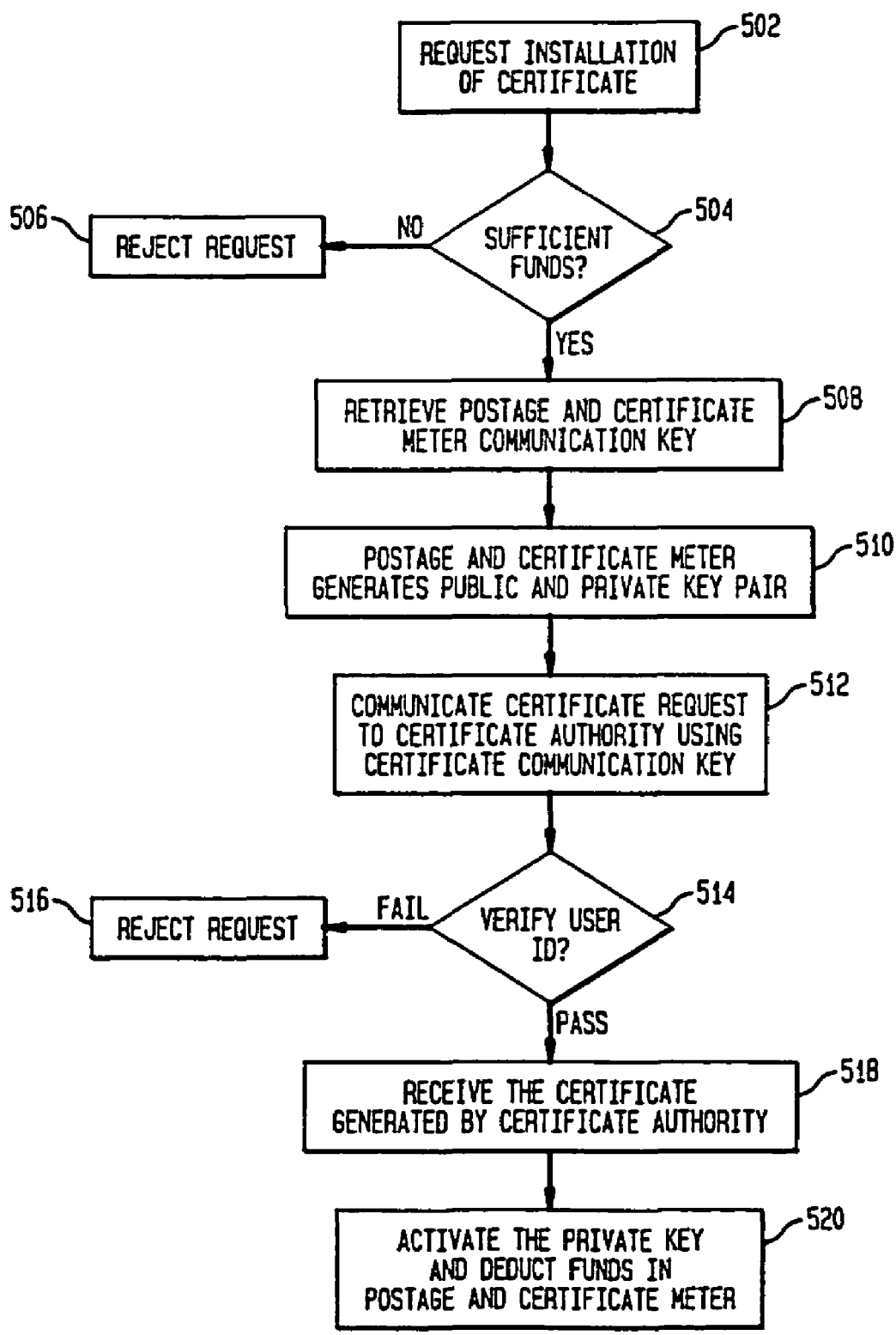
FIG. 5 is a flow chart of the generation and installation of a certificate in the system shown in FIG. 2.

Reference is now made to FIG. 5. A request for installation of the certificate is initiated at 502. A determination is made at 504 if sufficient funds are available in the postage and certificate meter subsystem 218 to cover the charges associated with processing the request. If sufficient funds are not available the request is rejected at 506. If sufficient funds are available the postage and certificate meter communication key is retrieved at 508. The postage and certificate meter thereafter generates a public and private key pair at 510. Thus, the secure postage and certificate meter subsystem 218 securely generates the private key at 510. Thus, the private key is never available outside of the secure housing of the postage and certificate meter subsystem 218. In this preferred embodiment the private key is not known to anyone, including the certificate owner, therefore the postage and certificate meter can enforce charges for any use of the private key.

If less security is required and depending upon the configuration and needs of the system, the system can be modified such that the user can enter the private key into the postage and certificate meter subsystem 218. The certificate request is communicated to the certificate authority using the certificate communication key at 512. This key is shown at 256 in FIG. 2.

A determination is made at 514 to whether the user identification has been verified. If the verification fails, the request is rejected at 516. If the identity is verified the certificate generated by certification is received from the authority at 518. Thereafter, the certificate is installed in the postage and certificate meter subsystem 218 via the personal computer modem 220 and processor 212 and communication port 216 to the communication port 234 of the postage and certificate meter subsystem 218. Additionally at 520 the funds are deducted from the postage and certificate meter for the generation and the requested certificate which activates user's private key.

Figure 6:
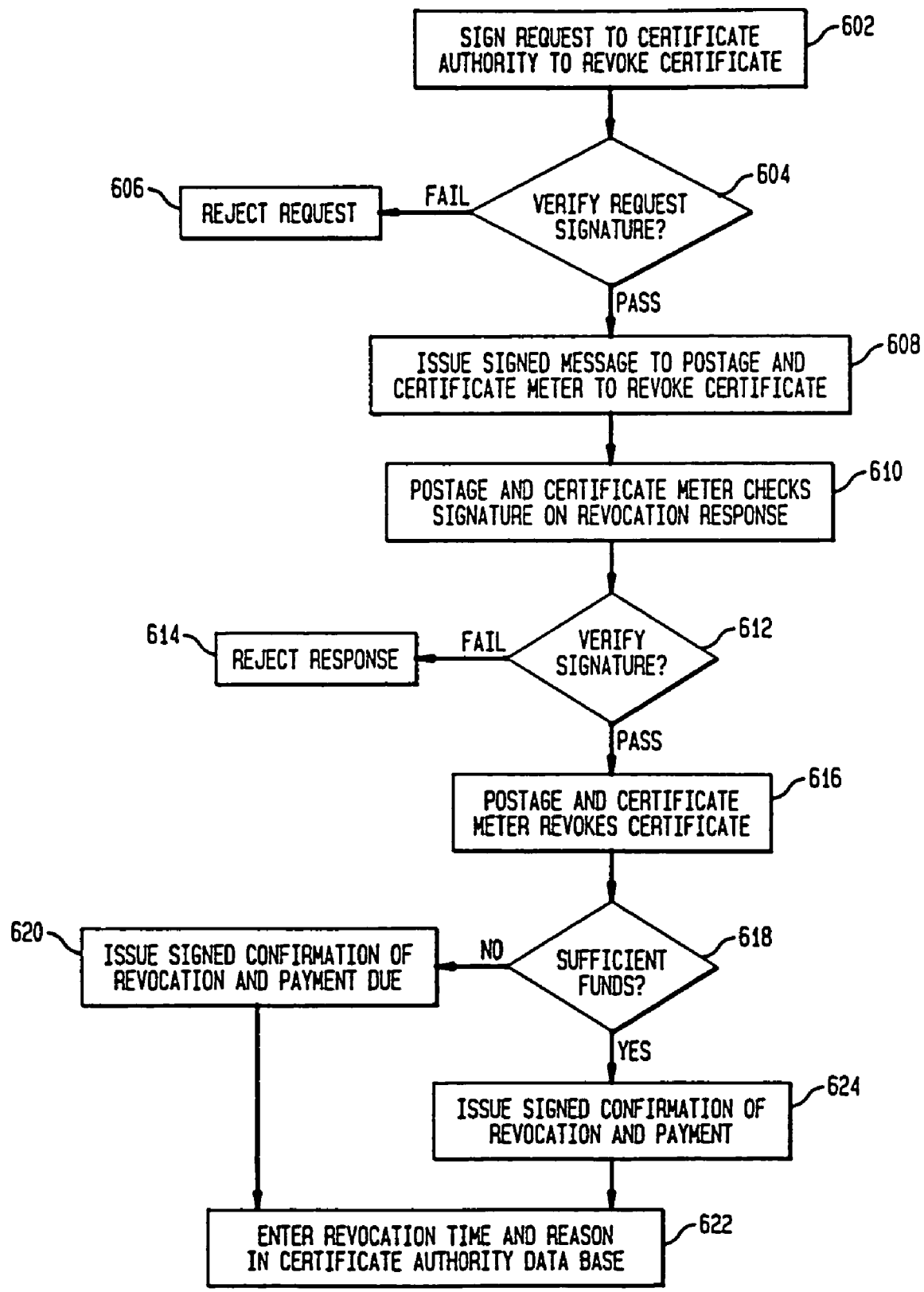
FIG. 6 is a flow chart of a process for revoking a certificate generated in accordance with the process shown in FIG. 5.

Reference is now made to FIG. 6 showing the process for revoking an issued certificate. This may occur, for example, where an individual believes that his or her private key has been compromised or as a matter of routine security where private keys are periodically updated and the like. Also, such revocation can occur when the authorization conditions can no longer be obtained and the certificate should, accordingly, be revoked. A request to the certificate authority to revoke a certificate is signed at 602. A verification of the request signature is made at 604. If the verification fails, the revocation request is rejected at 606. If the signature is verified, a signed message is issued to the postage and certificate meter subsystem 218 to revoke the certificate in question at 608. The postage and certificate meter subsystem 218 checks the signature on the revocation response at 610. If the signature fails to be verified at 612, the response issuing the signed message is rejected at 614. If on the other hand, the signature is verified, the postage and certificate meter revokes the certificate at 616. A determination is then made if sufficient funds are available at 618. If sufficient funds are not available a signed confirmation of the revocation and payment due is issued at 620. Thereafter, the revocation time and reason in the certification authority database is entered at 622. Further procedures, not shown may be taken to ensure payment due is in fact received. The handling of debiting the registers for certificate revocation will depend on the nature of the system and certificate involved and this may even be included as part of the certificate itself.

If at 618 sufficient funds are available, the signed confirmation of revocation and payment is issued at 624. This is entered into the certificate authority database at 622.

The process described in FIG. 6 may be adapted for a forced revocation of due certificate, for a example by the certification authority or its agent. In this case, at the contract with the certification authority or during inspection process due revocation starts at 608. The payment at 624 can be disabled. If no contact is made the certificate meter will either run out of money or timed out after a prespecified time period.

Figure 7A:
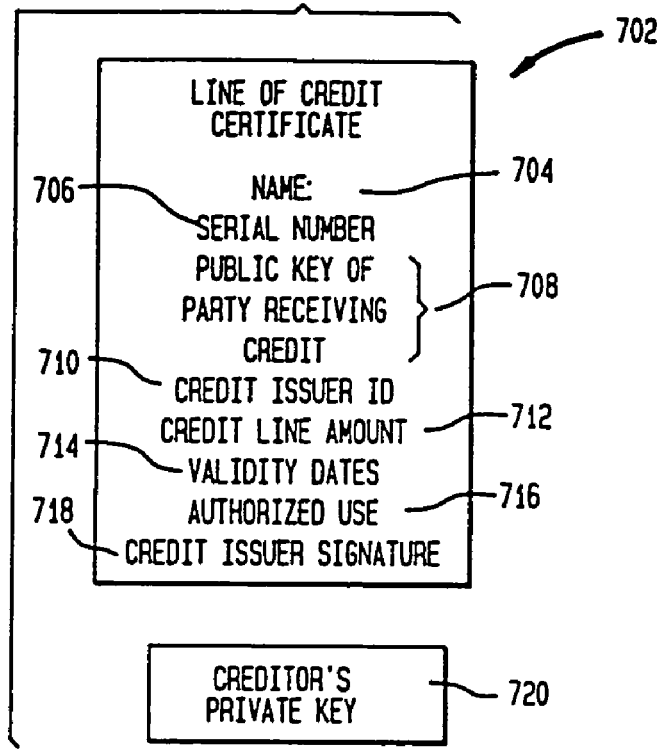
FIGS. 7A and 7B are examples of various types of certificates which may be issued by the system shown in FIG. 2.

Reference is now made to FIG. 7A. A line of credit certificate 702 is shown as an example of one type of credit certificate. This certificate similar to the certificate shown in FIG. 1 includes the name of the individual receiving credit at 704, the serial number or unique identifier of the certificate at 706 and the public key of the creditor (person receiving credit) may preferably be included at 708. The credit issuer identification may be included at 710 as well as the credit line amount at 712, the validity dates at 714 and the authorized use at 716. Also included in the certificate is the credit issuer signature 718. The creditor private key is shown at 720 and is securely maintained by the creditor.

It should be noted that the name at 704 as well as the name in various other certificates shown in the present application is in fact a unique identifier and may be a number or other identifying data of the certificate holder.

Figure 7B:
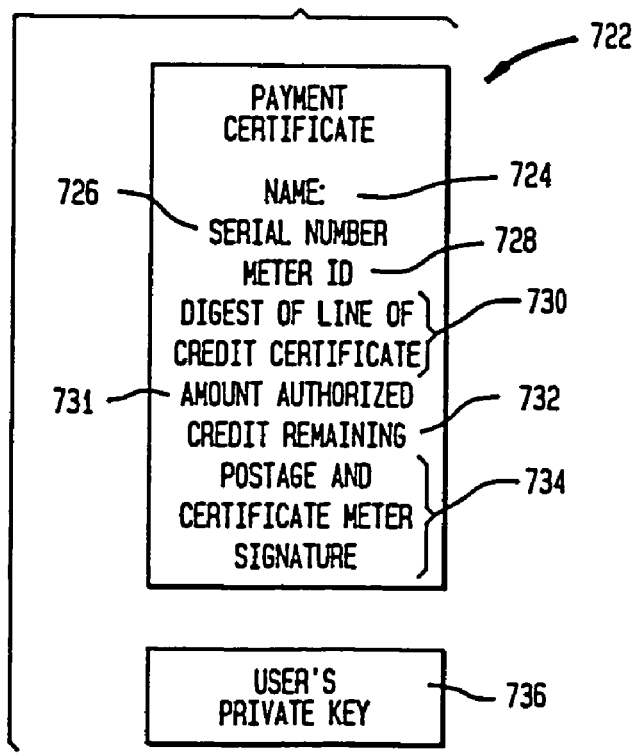

Reference is now made to FIG. 7B which is another example of a certificate, here a payment certificate which is related to the line of credit certificate shown in 7A. The certificate shown generally at 722 may include the name of the certificate holder at 724, unique identification or serial number at 726, meter identification at 728, digest of line of credit certificate at 730, amount authorized at 731, credit remaining at 732 and, finally, the postage and certificate meter signature at 734. The user private key associated with the signature is shown at 736 and is treated as confidential and protected information.

Figure 8:
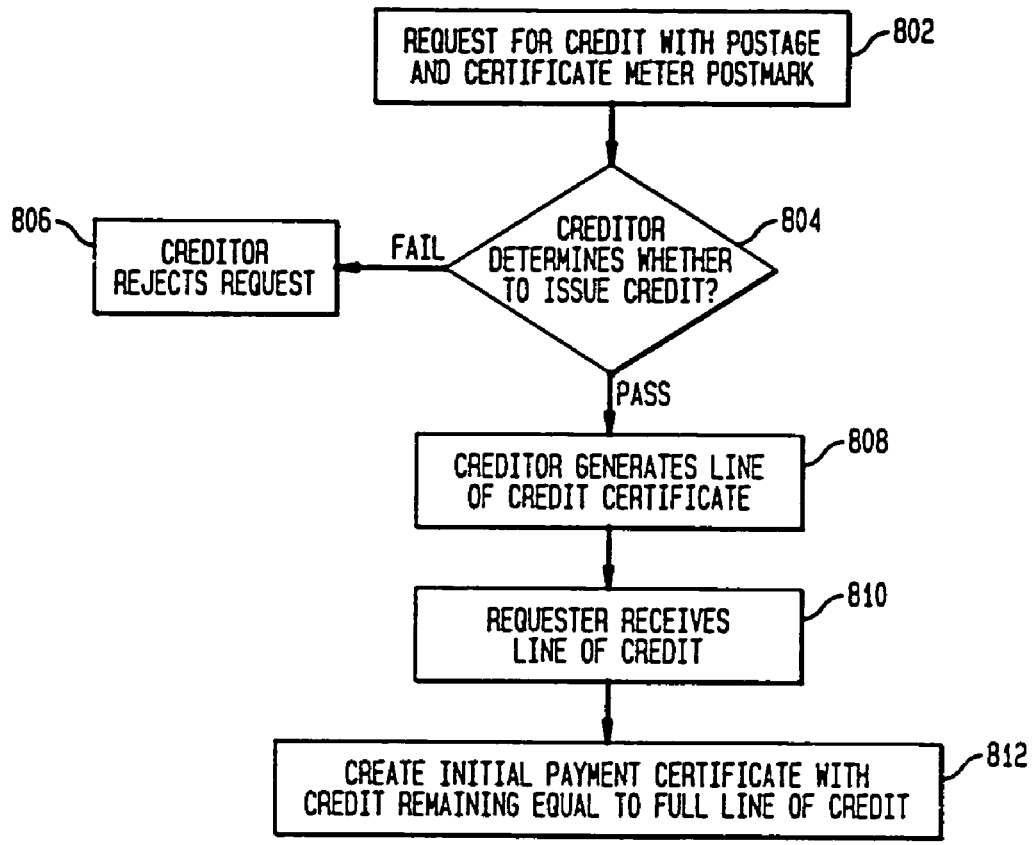
FIG. 8 is a flow chart of the process for receiving a line of credit by the system shown in FIG. 2; and, FIG. 9 is a flow chart of payment from the line of credit implemented by the operation shown in FIG. 8.

Reference is now made to FIG. 8 showing the process for receiving a line of credit. The request for credit with postage and certificate meter postmark is initiated at 802. The creditor determines whether to issue credit at 804. If the credit check fails, the creditor rejects the request at 806. If the credit check passes, the creditor generates the line of credit certificate at 808. The line of credit is received by the requester at 810 and an initial payment certificate with credit remaining equal to the full line of credit can be created at 812. This certificate is stored in the postage and certificate meter subsystem 218 memory 226.

Figure 9:
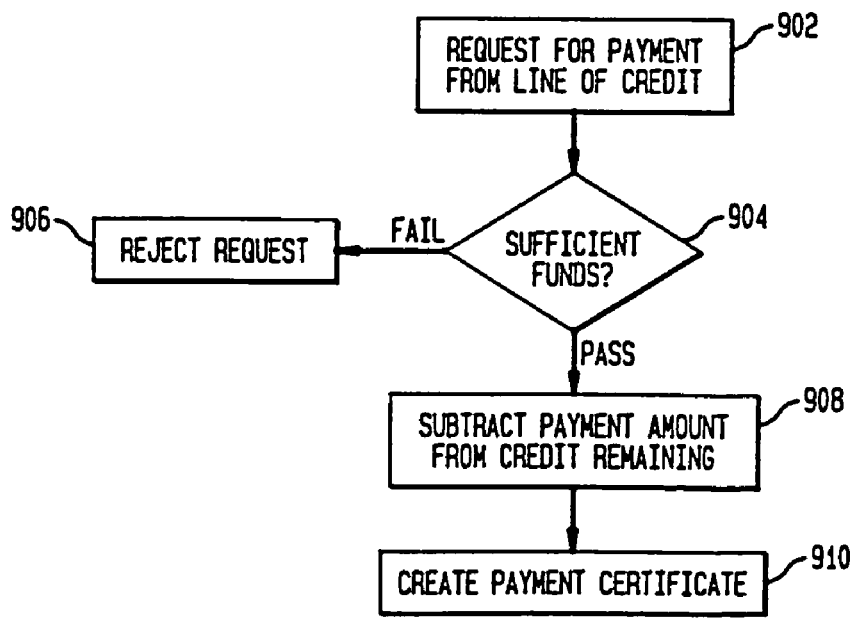

Reference is now made to FIG. 9 showing payment from a issued line of credit. A request for payment from the line of credit is initiated at 902. This request may be initiated by the user of the postage and certificate meter 218 as part of a transaction purchasing goods or services. If sufficient funds are determined to be not available at 904 the request is rejected at 906. If, on the other hand, sufficient funds are determined to be available at 904, the payment amount is subtracted from the credit remaining at 908 and a payment certificate is created at 910. In this manner a payment certificate is created and provided to the merchant evidencing the availability of funds to pay for the transaction and enables the merchant who receives and authenticates the payment certificate to receive funds from the requester's bank. The merchant delivers the merchandise and sends a copy of the payment certificate to the party who provided the credit to the user of the postage and certificate meter subsystem 218. This is evidence of authorization by the user and authorizes the issuer of credit to pay the merchant. This constitutes the proof of request of payment and constitutes an authorization by the user to have payment issued to the merchant. While the present invention has been disclosed and described with reference to the disclosed embodiments thereof, it will be apparent, as noted above, that variations and modifications may be made.

It should be recognized that the present invention provides a mechanism for the active forceful revocation of the certificate itself so that the certificate holder cannot reuse the certificate. This is for several reasons. The funding registers periodically must be serviced. For ascending/descending register systems, the recharging process where funds are added require communications with the trusted third party at which time the revocation can be implemented Moreover, as noted above, in certain countries meters are leased and owned by the manufacturer thereby giving legal access to the meter. For current account systems, failure to service the meter can cause the meter to lock up. Various lock ups and time outs can also be included in the meter to preclude further operation of the system. Additionally, by virtue of the utilization of the postage or value metering including postage metering devices, inherent advantages in the postage metering system such as inspections, security, trusted third party (postal authority) become available to utilize for enhanced security.

While the present invention has been disclosed and described with reference to the disclosed embodiments thereof, it will be apparent that many various and modifications may be made. For example when a user needs to verify a certificate obtained from another party, the user needs to have access to the public key of the trusted third party certification authority that signed the certificate in question. This can be done by storing the certification authority's public key in the postage and certificate meter and updating this key when needed by using communication parts 234 and 216 (FIG. 2) or by entering this key manually via personal computer 204. As another example, the postage meter and certificate meter subsystem may be implemented as a smart card or as a computer card peripheral or internal circuit board or as a computer PCMCIA card, also known as PC card. Thus, it is intended in the following claims to cover each variation and modification that falls within the true spirit and scope of the present invention.

What is claimed is:

1. A method for validating a signed digital message, comprising the steps of:
   providing a register having funds stored therein;
   receiving a signed digital message from a sender;
   determining if sufficient funds are present in the register for validating the message;
   deducting funds from the register for validating the message; and
   validating the signed digital message using a public key of the sender.

2. The method of claim 1, comprising the further steps of:
   receiving with the signed digital message a certificate of the sender, the certificate being signed using a private key of a certificate authority;
   validating the certificate using a public key of the certificate authority; and
   extracting the public key of the sender from the certificate for use in validating the signed digital message.

\* \* \* \* \*